(12) United States Patent
Frager

(10) Patent No.: US 9,974,246 B2
(45) Date of Patent: May 22, 2018

(54) ANCHORING DEVICE FOR SELF-PROPELLED IRRIGATION SYSTEM

(71) Applicant: Polaris Products LLC, Fairbury, NE (US)

(72) Inventor: James R. Frager, Fairbury, NE (US)

(73) Assignee: Polaris Products LLC, Fairbury, NE (US)

( * ) Notice: Subject to any disclaimer, the term of this patent is extended or adjusted under 35 U.S.C. 154(b) by 120 days.

(21) Appl. No.: 15/251,194

(22) Filed: Aug. 30, 2016

(65) Prior Publication Data

US 2017/0055468 A1 Mar. 2, 2017

Related U.S. Application Data

(60) Provisional application No. 62/212,921, filed on Sep. 1, 2015.

(51) Int. Cl.
| | |
|---|---|
| *A01G 25/09* | (2006.01) |
| *B05B 3/18* | (2006.01) |
| *E02D 5/74* | (2006.01) |
| *E02D 5/80* | (2006.01) |

(52) U.S. Cl.
CPC ......... *A01G 25/092* (2013.01); *A01G 25/097* (2013.01); *A01G 25/09* (2013.01); *A01G 25/095* (2013.01); *B05B 3/18* (2013.01); *E02D 5/74* (2013.01); *E02D 5/80* (2013.01); *E02D 5/801* (2013.01)

(58) Field of Classification Search
CPC .... A01G 25/09; A01G 25/092; A01G 25/095; A01G 25/097; B05B 3/18; E02D 5/74; E02D 5/80; E02D 5/801

USPC .................... 239/722, 723, 728; 52/156, 157
See application file for complete search history.

(56) References Cited

U.S. PATENT DOCUMENTS

| | | | | |
|---|---|---|---|---|
| 3,973,409 | A * | 8/1976 | Asayama | E02D 5/74 175/292 |
| 4,702,047 | A * | 10/1987 | Stokes | E02D 5/801 114/294 |
| 6,431,475 | B1 * | 8/2002 | Williams | A01G 25/09 239/740 |
| 7,581,707 | B2 * | 9/2009 | Saraf | E04H 12/2223 135/118 |
| 8,991,108 | B1 * | 3/2015 | Zamrzla | B60T 1/14 188/7 |

(Continued)

*Primary Examiner* — Darren W Gorman
*Assistant Examiner* — Joseph A Greenlund
(74) *Attorney, Agent, or Firm* — Jeffrey L. Thompson; Thompson & Thompson, P.A.

(57) ABSTRACT

An anchoring device for a self-propelled irrigation system includes a drive assembly that drives a soil auger into the ground to anchor a drive tower of the irrigation system. The soil auger is rotatably driven about a vertical axis and movable vertically relative to the drive tower. The soil auger includes a lower tip, a multi-sided head at an upper end, and a helical screw portion between the lower tip and the upper end. The drive assembly includes a sleeve member with an inner surface that mates with the head of the soil auger and allows the soil auger to slide within the sleeve member while rotating together with the sleeve member. A bit cleaner assembly is arranged to engage the helical screw portion of the soil auger to clean soil from the auger and to cause the auger to move vertically relative to the sleeve member upon rotation.

22 Claims, 7 Drawing Sheets

(56) References Cited

U.S. PATENT DOCUMENTS

| | | | | |
|---|---|---|---|---|
| 8,998,162 B1* | 4/2015 | Gutha | ............... | A01G 25/09 |
| | | | | 239/735 |
| 9,149,012 B1* | 10/2015 | Sorensen | ............. | A01G 25/092 |
| 9,215,847 B2* | 12/2015 | Bainter | ............... | A01G 25/092 |
| 9,271,453 B2* | 3/2016 | Frager | ............... | A01G 25/092 |
| 2012/0308308 A1* | 12/2012 | Stewart | ............... | E02D 27/00 |
| | | | | 405/229 |
| 2015/0121770 A1* | 5/2015 | Korus | ............... | A01G 25/092 |
| | | | | 52/1 |

\* cited by examiner

ANCHORING DEVICE FOR SELF-PROPELLED IRRIGATION SYSTEM

RELATED APPLICATIONS

This application claims the benefit of U.S. Provisional Patent Application No. 62/213,921 filed on Sep. 1, 2015. This application also relates to U.S. Provisional Patent Application No. 61/888,590 filed on Oct. 9, 2013, U.S. Provisional Patent Application No. 62/046,780 filed on Sep. 5, 2014, and U.S. Utility Patent Application No. 14/511,028 filed on Oct. 9, 2014, now U.S. Pat. No. 9,271,453. The entire contents of these prior applications are incorporated herein by reference.

BACKGROUND OF THE INVENTION

Field of the Invention

This invention relates generally to self-propelled irrigation systems, and in particular, to methods and devices for preventing self-propelled irrigation systems from overturning in high wind situations.

Description of the Related Art

Self-propelled irrigation systems are used to provide water for agricultural purposes in arid regions. Typically, such systems include a series of spaced drive towers connected by truss sections that support an elongated water distribution pipeline between the towers. In center pivot systems, the water distribution pipe extends radially from a central pivot connected to a water supply. In linear move irrigation systems, the water distribution pipe extends laterally from a canal feed or hose drag system that provides the water supply.

Water passing through the distribution pipeline is forced out through a number of sprinkler heads, spray guns, drop nozzles, or the like spaced along the length of the pipe. Each drive tower in the system is supported on wheels or other structures that are driven at slow speeds to move the tower in a circular path about the central pivot, or a linear path in the case of linear move systems, to irrigate an agricultural field.

Such irrigation systems are prone to being damaged during severe weather by high winds that cause one or more towers of the irrigation system to overturn. When a tower overturns, major damage to the pipeline, truss sections, and other components typically occurs, resulting in significant downtime and expense.

Soil augers are known in the prior art and are used, for example, in ground anchoring systems for building foundations. Soil augers can be wound into the ground much like a screw into wood. Soil augers are sometimes referred to as screw piles, screw-in foundations, screw piers, helical piles, helical anchors, screw anchors, screw foundations and helical piers.

A need exists in the agricultural industry for a system that prevents sprinkler systems from overturning and becoming damaged during windstorms.

SUMMARY OF THE INVENTION

An object of the present invention is to provide an anchoring device for preventing a self-propelled irrigation system from overturning in high winds.

A further object of the present invention is to provide a self-propelled irrigation system that resists overturning in high winds.

A further object of the present invention is to provide an anchoring device for use on a self-propelled irrigation system that uses a soil auger and a drive motor mounted on the irrigation system to anchor the irrigation system to the ground during high wind conditions.

A still further object of the present invention is to provide an anchoring device for a self-propelled irrigation system with a control system to automatically or remotely activate the anchoring device upon detecting a wind speed exceeding a predetermined threshold speed.

A still further object of the present invention is to provide an anchoring device that can be adapted to and used on a variety of different brands and types of self-propelled irrigation systems.

To accomplish these and other objects of the present invention, an anchoring device for a self-propelled irrigation system is provided. The anchoring device includes a drive assembly that drives a soil auger into the ground to anchor a drive tower of the irrigation system to the ground. The soil auger is rotatably driven about a vertical axis and movable vertically relative to the drive tower. The soil auger includes a lower tip, a multi-sided head at an upper end, and a helical screw portion between the lower tip and the upper end. The drive assembly includes a sleeve member with an inner surface that mates with the head of the soil auger and allows the soil auger to slide within the sleeve member while rotating together with the sleeve member. A bit cleaner assembly is arranged to engage the helical screw portion of the soil auger to clean soil from the auger and to cause the auger to move vertically relative to the sleeve member upon rotation. An anemometer is provided on the irrigation system to measure wind speed, and a controller is provided to notify an operator when a predetermined wind speed threshold is exceeded. The controller can be used to automatically activate the drive assembly when the predetermined wind speed threshold is exceeded, or to receive a remote command from the operator to activate the drive assembly to lower the soil auger.

According to one aspect of the present invention, an anchoring device for a self-propelled irrigation system is provided, comprising: a soil auger supported on the irrigation system and arranged to be raised and lowered relative to the irrigation system, the soil auger comprising a lower tip, a multi-sided head at an upper end, and a helical screw portion between the lower tip and the upper end; a drive motor mounted to the irrigation system; a drive mechanism arranged between the drive motor and the soil auger to transfer rotational force from the drive motor to the soil auger, the drive mechanism comprising a sleeve member having a generally vertical longitudinal axis and a multi-sided inner surface that mates with the multi-sided head of the soil auger and allows the soil auger to slide within the sleeve member while remaining fixed against rotation relative to the sleeve member; and at least one bit cleaner arranged to engage the helical screw portion of the soil auger to clean soil and debris from the auger and to cause the soil auger to move vertically relative to the sleeve member upon rotation of the sleeve member together with the soil auger, whereby the soil auger can be driven into the soil to anchor the irrigation system to prevent overturning during severe weather.

According to another aspect of the present invention, a self-propelled irrigation system that resists overturning in high winds is provided, comprising: an elongated pipeline supported above a field by at least one drive tower, the drive tower comprising a base beam assembly, a tower structure supported by and extending above the base beam assembly for supporting the elongated water pipeline above the base beam assembly, and a plurality of drive assemblies for supporting and propelling the base beam assembly over a field; and an anchoring device for anchoring the drive tower to the ground. The anchoring device comprises: a soil auger supported on the irrigation system and arranged to be raised and lowered relative to the irrigation system, the soil auger comprising a lower tip, a multi-sided head at an upper end, and a helical screw portion between the lower tip and the upper end; a drive motor mounted to the irrigation system; a drive mechanism arranged between the drive motor and the soil auger to transfer rotational force from the drive motor to the soil auger, the drive mechanism comprising a sleeve member having a generally vertical longitudinal axis and a multi-sided inner surface that mates with the multi-sided head of the soil auger and allows the soil auger to slide within the sleeve member while remaining fixed against rotation relative to the sleeve member; and at least one bit cleaner arranged to engage the helical screw portion of the soil auger to clean soil and debris from the auger and to cause the soil auger to move vertically relative to the sleeve member upon rotation of the sleeve member together with the soil auger, whereby the soil auger can be driven into the soil to anchor the irrigation system to prevent overturning in high winds.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
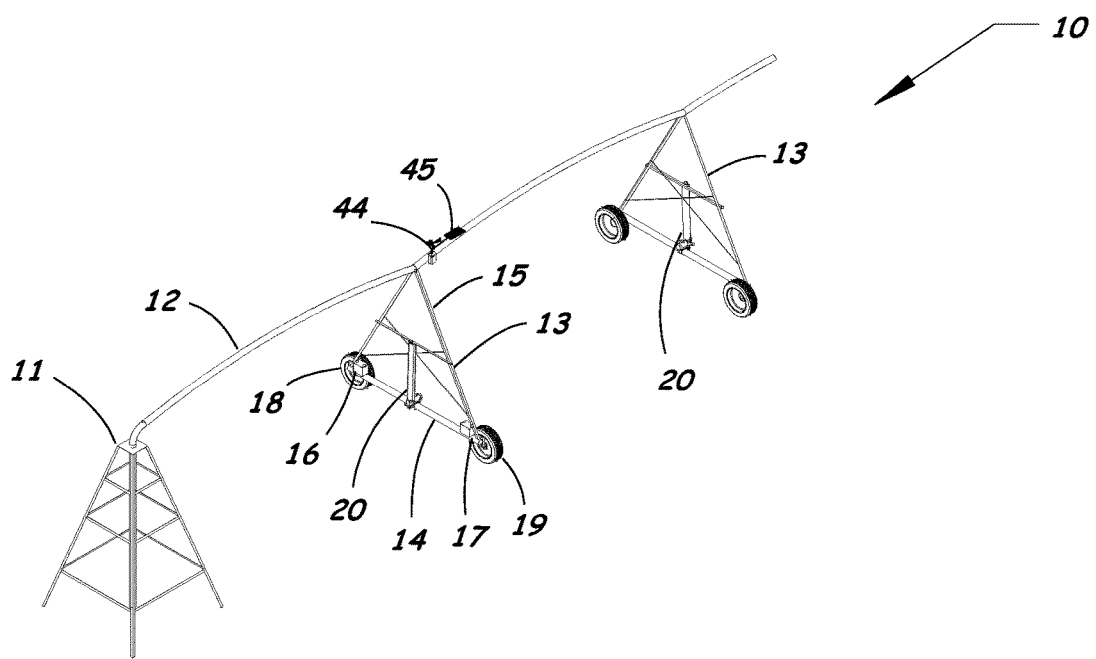
FIG. 1 is a perspective view of a center pivot-type self-propelled irrigation system equipped with anchoring devices according to the present invention.
Figure 2:
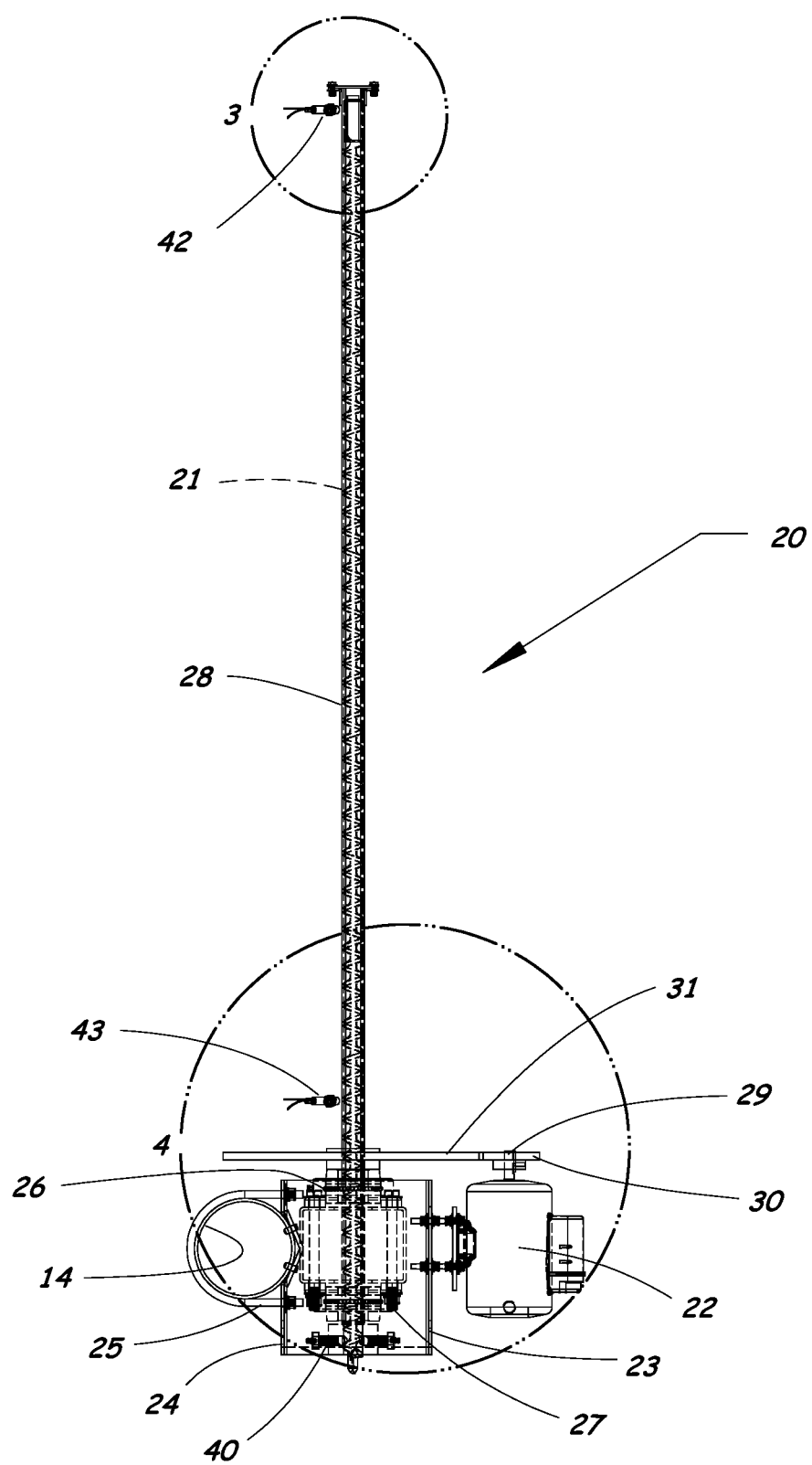
FIG. 2 is an elevation view of an anchoring device for self-propelled irrigation systems according to a first embodiment of the present invention.
Figure 3:
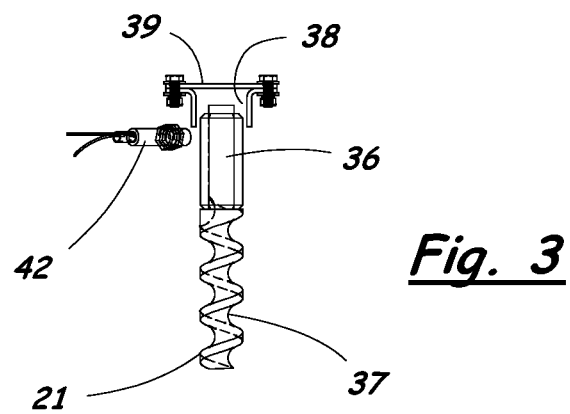
FIG. 3 is a detail elevation view of the area A of the anchoring device shown in FIG. 2.
Figure 4:
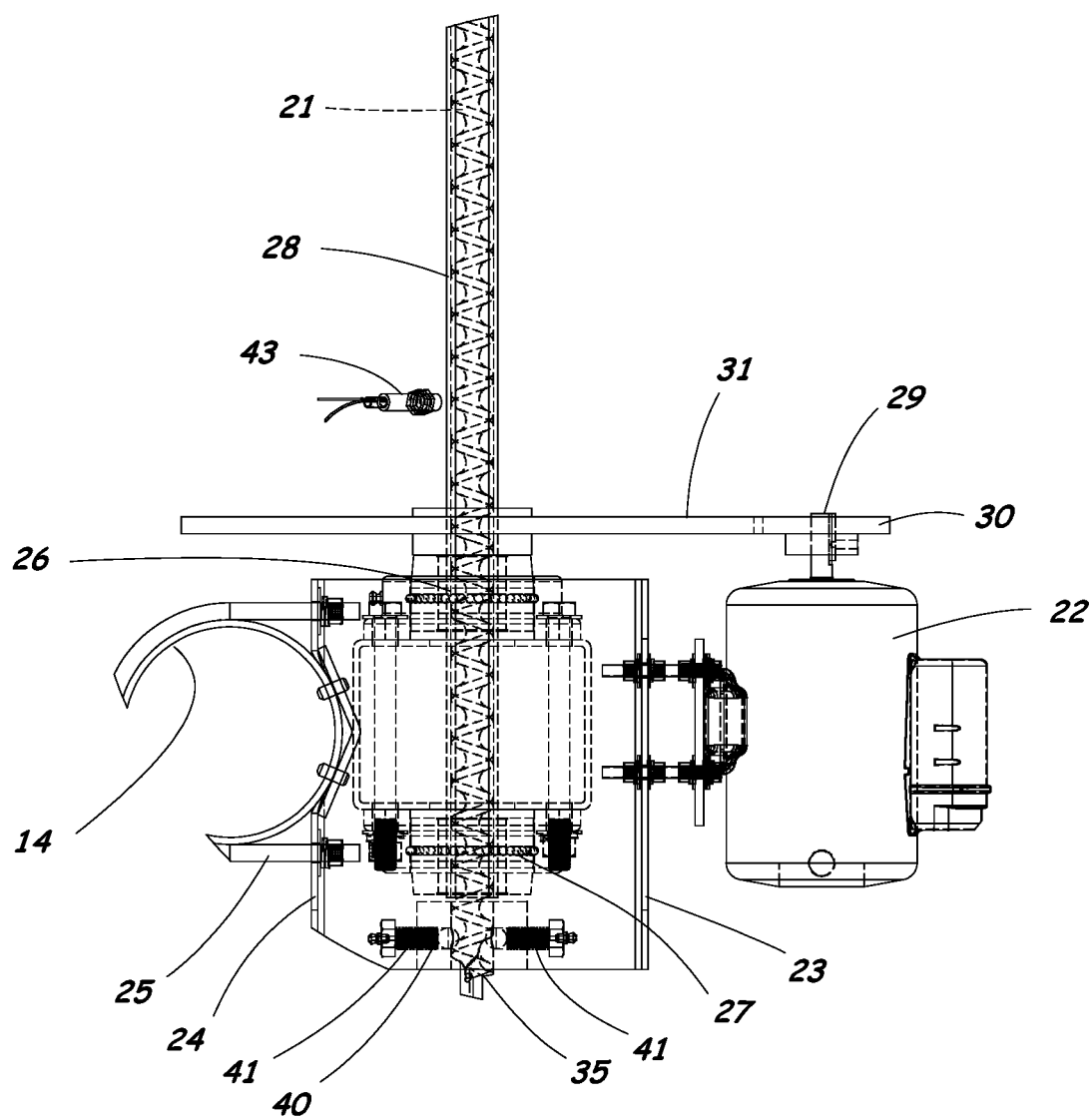
FIG. 4 is a detail elevation view of the area B of the anchoring device shown in FIG. 2.
Figure 5:
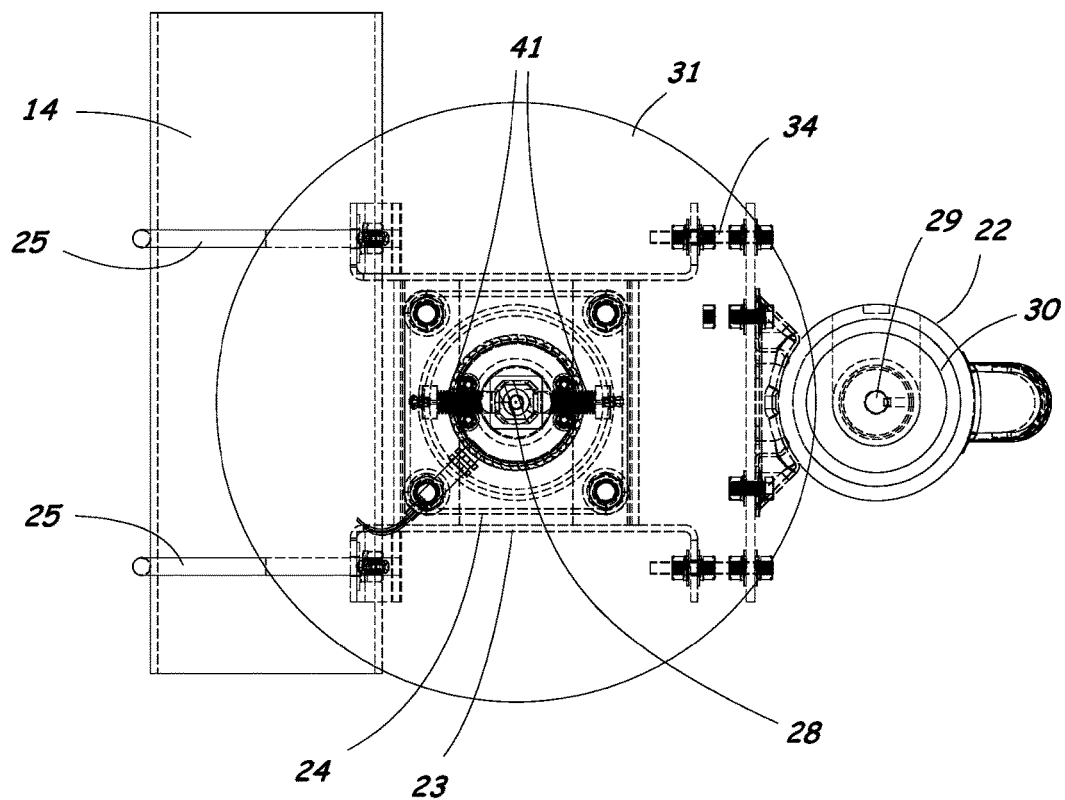
FIG. 5 is a top plan view of the anchoring device shown in FIG. 2.
Figure 6:
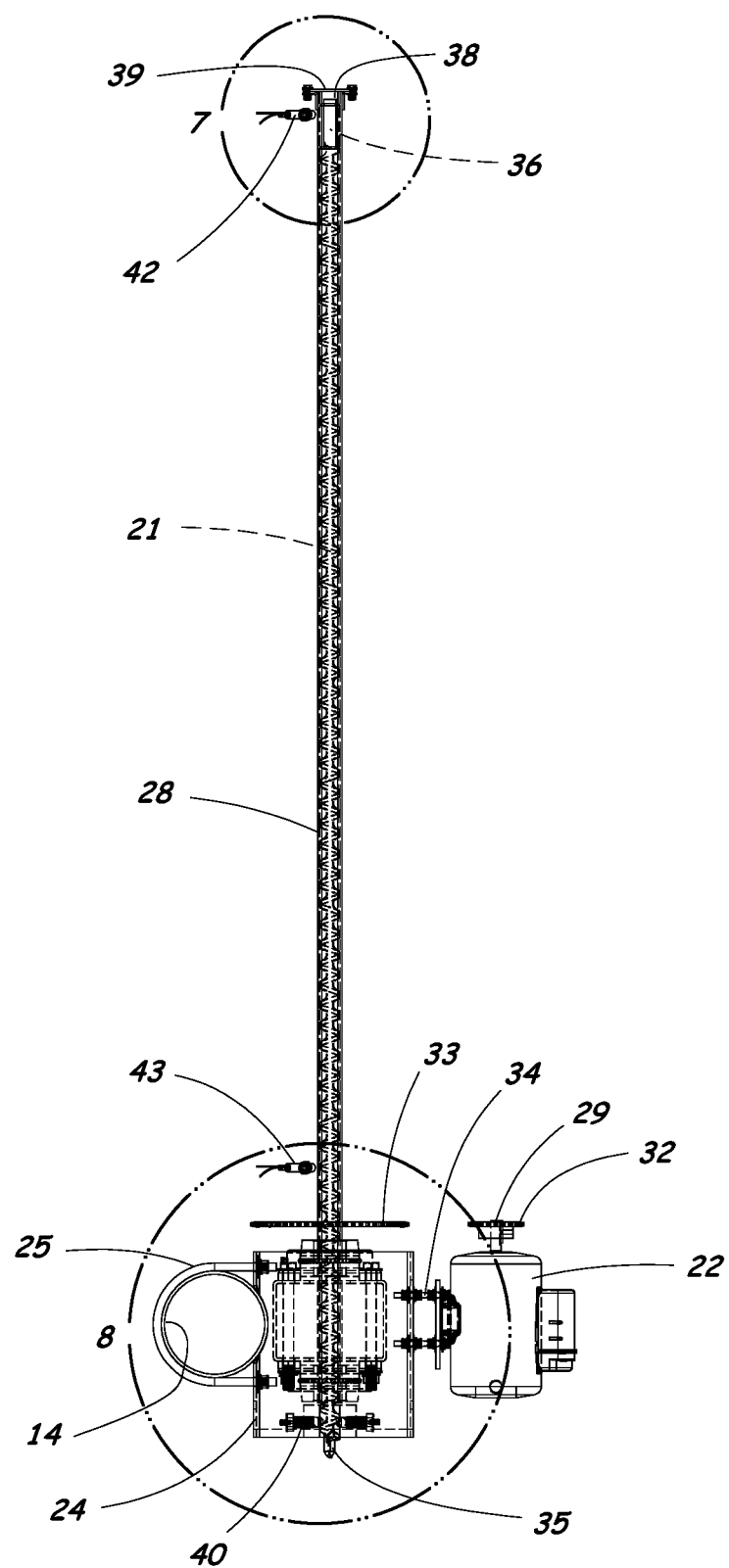
FIG. 6 is an elevation view of an anchoring device for self-propelled irrigation systems according to a second embodiment of the present invention.
Figure 7:
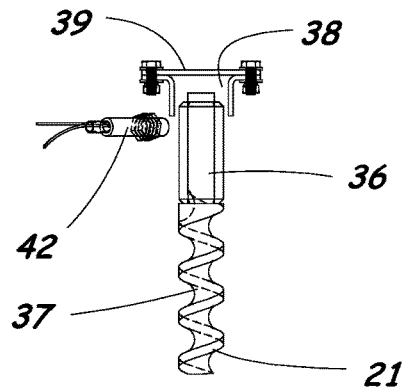
FIG. 7 is a detail elevation view of the area A of the anchoring device shown in FIG. 6.
Figure 8:
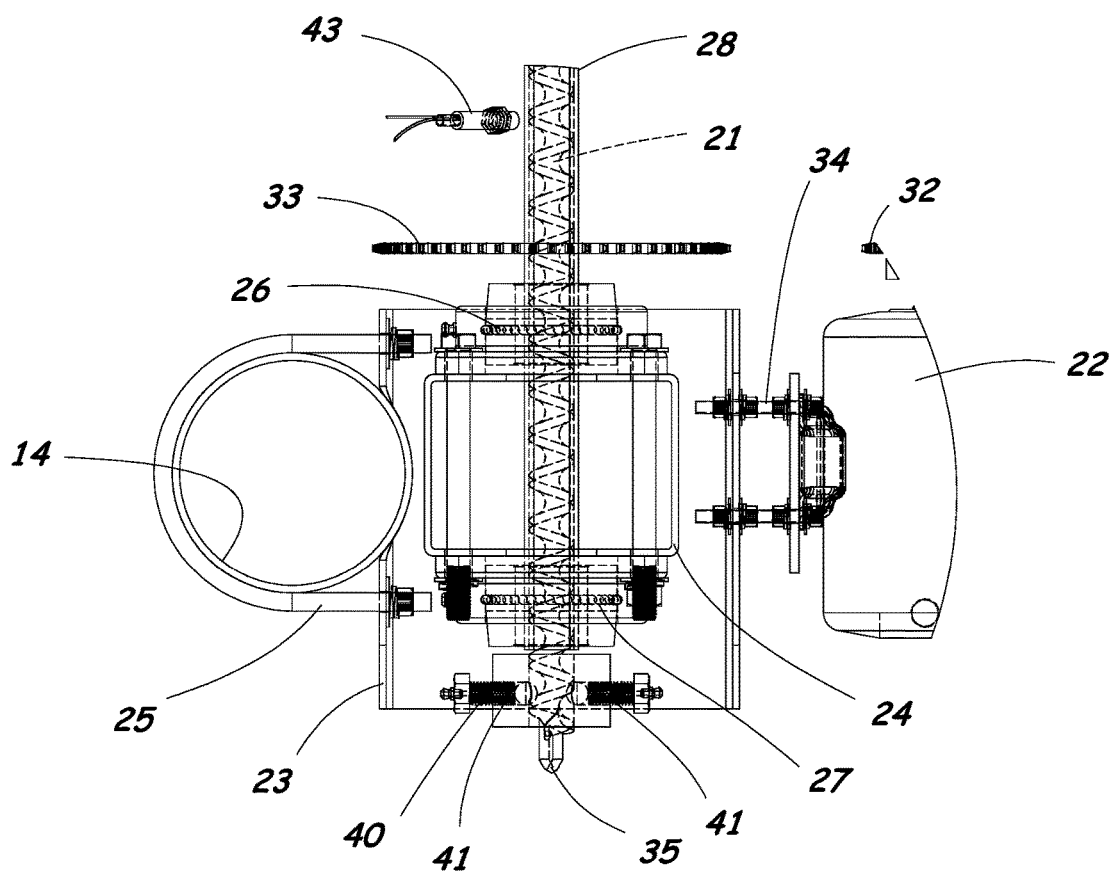
FIG. 8 is a detail elevation view of the area B of the anchoring device shown in FIG. 6.
Figure 9:
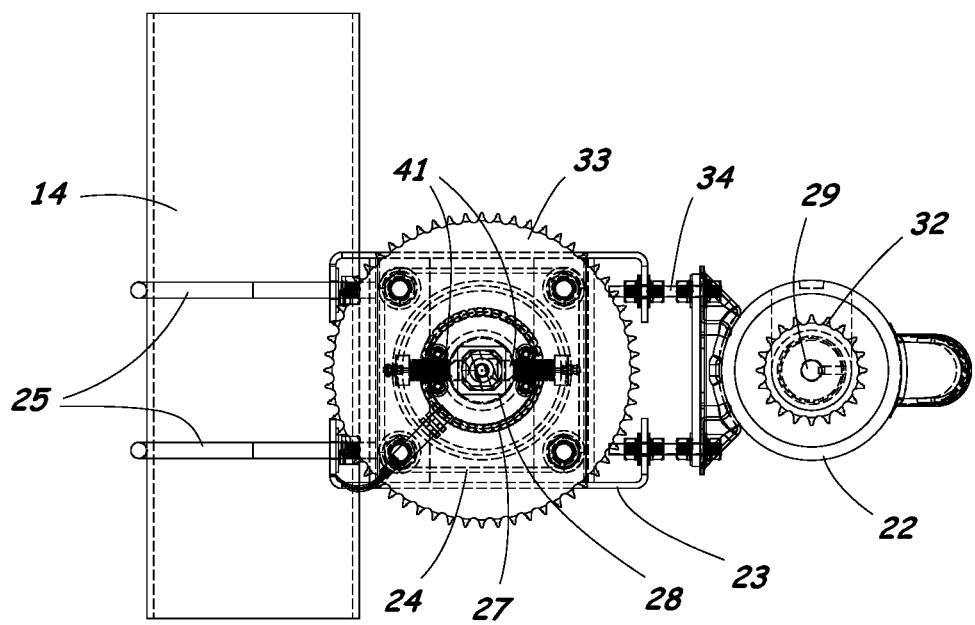
FIG. 9 is a top plan view of the anchoring device shown in FIG. 6.

A self-propelled irrigation system 10 equipped with anchoring devices 20 according to the present invention will now be described with reference to FIGS. 1 to 9 of the accompanying drawings.

The self-propelled irrigation system 10 includes a center pivot structure 11, an elongated water pipeline 12, and a plurality of drive towers 13 for supporting the water pipeline 12 above a field. The drive towers 13 and water pipeline 12 are arranged to move around the center pivot structure 11, which remains at a fixed location. However, it should be appreciated that the present invention can also be used with other types of self-propelled irrigation systems, such as lateral move irrigation systems and corner pivot irrigation systems, which are well known in the art.

The drive towers 13 each include a frame assembly comprising a base beam 14 and a tower structure 15 that extends upwardly from opposite ends 16, 17 of the base beam 14. The water pipeline 12 is supported by the tower structure 15 above the base beam 14 in a conventional fashion. First and second drive assemblies 18, 19 are mounted to respective ends 16, 17 of the base beam 14 for supporting and propelling the frame assembly over a field. For example, each drive assembly 18, 19 may comprise a gear box and a hub and wheel assembly. An electric motor or hydraulic drive is typically used to provide power to the drive assemblies 18, 19.

In the illustrated embodiment, the wheel assemblies 18, 19 positioned at each end of the base beam 14 are sufficiently far apart to provide a stable support for the system during normal weather conditions. However, in high wind conditions, the drive tower 13 will tend to tip about the wheel assembly 18, 19 on the downwind side of the system 10. The present invention provides a solution to the overturning tendency by using a powered anchoring device 20 to anchor the drive tower 13 to the ground.

The anchoring device 20 includes a soil auger 21 supported on the drive tower 13 and arranged to be raised and lowered relative to the drive tower 13. A drive motor 22 is provided to rotate the soil auger 21 in a first direction to wind the soil auger 21 into the ground to anchor the drive tower 13 to the ground. The drive motor 22 is reversible to rotate the soil auger 21 in a second direction to unwind the soil auger 21 to retract the soil auger 21 from the ground after the high wind conditions subside.

The anchoring device 20 includes a support bracket assembly 23 that attaches to the base beam 14 of the irrigation system 10. The support bracket assembly 23 includes a bearing housing 24 and a pair of U-bolts 25 connecting the bearing housing 24 to the base beam 14. The bearing housing 24 has an upper bearing 26 and a lower bearing 27 for supporting a sleeve member 28 for rotation within the bearing housing 24.

The sleeve member 28 has a generally vertical longitudinal axis and a multi-sided inner surface that extends the length of the sleeve member 28. For example, the sleeve member 28 can have a square cross section that provides a multi-sided inner surface in the form of a generally square chamber. The sleeve member 28 is supported for rotation about its vertical longitudinal axis within the bearing housing 24. However, the sleeve member 28 does not move vertically relative to the bearing housing 24.

The drive motor 22 is mounted stationary to the bearing housing 24 on the side of the bearing housing 24 opposite from the base beam 14 of the irrigation system 10. The drive motor 22 has a drive shaft 29 that rotates about a vertical axis. In the embodiment illustrated in FIGS. 2 to 5, the drive motor 22 is operably connected to the sleeve member 28 by direct drive gears 30, 31 connected to the drive shaft 29 and the sleeve member 28. The direct drive gears 30, 31 provide a desired gear reduction so that the sleeve member 28 is rotated at a slower speed than the output shaft 29 of the drive motor 22. The sleeve member 28 is rotatably driven about its vertical longitudinal axis by the drive motor 22.

In the alternative embodiment illustrated in FIGS. 6 to 9, the output shaft 29 of the drive motor 22 is operably connected to the sleeve member by a chain drive with a drive sprocket 32 on the output shaft 29 of the drive motor 22 and a driven sprocket 33 on the sleeve member 28. A plurality of mounting bolts 34 between the drive motor 22 and the bearing housing 24 are arranged to secure the drive motor 22 to the bearing housing 24 and also function as a chain tightener. The sprockets 32, 33 are sized to provide the desired gear reduction so that the sleeve member 28 is rotated at a slower speed than the output shaft 29 of the drive motor 22.

The soil auger 21 includes a lower tip 35, a multi-sided head 36 at an upper end, and a helical screw portion 37 between the lower tip 35 and the upper end 36. The lower tip 35 is preferably a carbide bit that allows the soil auger 21 to penetrate hard soils and rocks. The helical screw portion 37 of the soil auger 21 is preferably made of steel. The head 36 at the upper end of the soil auger 21 can be made of steel, brass, or dissimilar metal to allow the soil auger 21 to slide with reduced friction within the sleeve member 28.

The soil auger 21 is positioned within the sleeve member 28 with the multi-sided head 36 mated with the multi-sided inner surface of the sleeve member 28. The soil auger 21 slides within the sleeve member 28 between its raised and lowered positions while remaining fixed against rotation relative to the sleeve member 28. For example, the head 36 of the soil auger 21 can have a square cross section that mates with a square cross section of the sleeve member 28 to allow sliding movement of the soil auger 21 within the sleeve member 28 while preventing rotation of the soil auger 21 relative to the sleeve member 28. With this arrangement, the soil auger 21 rotates about its longitudinal axis whenever the sleeve member 28 is rotatably driven by the drive motor 22, and can slide within the sleeve member 28 between its raised and lowered positions. The sleeve member 28 thus provides part of the drive mechanism arranged between the drive motor 22 and the soil auger 21 to transfer rotational force from the drive motor 22 to the soil auger 21.

The sleeve member 28 has an open upper end 38 with a removable top cap 39 for covering the open upper end 38 to provide a weather seal. The top cap 39 can be removed to allow the soil auger 37 to be inserted into and removed from the sleeve member 28 through the open upper end 38.

A bit cleaner assembly 40 is arranged to engage the helical screw portion 37 of the soil auger 21 below or within a lower part of the support bracket assembly 23. The bit cleaner assembly 40 functions to clean soil and debris from the soil auger 21 during operation, to cause vertical movement of the soil auger 21 relative to the sleeve member 28 when the soil auger 21 rotates, and to prevent the soil auger 21 from moving vertically relative to the base beam 14 of the irrigation system 10 when the soil auger 21 is stationary. The bit cleaner assembly 40 includes at least one, and preferably two to four bit cleaners 41 which extend into the valleys of the helical screw portion 37 of the soil auger 21.

An upper/lower limit switch assembly is provided for sensing when the soil auger 21 reaches its upper and lower limits of movement. The limit switch assembly includes an upper proximity sensor 42 positioned to detect when the soil auger 21 reaches its fully raised position within the sleeve member 28, and a lower proximity sensor 43 positioned to detect when the soil auger 21 reaches a fully lowered position within the soil.

In operation, as the drive motor 22 rotates in one direction, the soil auger 21 rotates and moves vertically downward within the sleeve member 28 until the soil auger 21 augers itself into the soil. As the drive motor 22 turns in the other direction, the soil auger 21 rotates and moves vertically upward within the sleeve member 28 out of the soil and into its raised position. The upper and lower proximity sensors 42, 43 are used to ensure that the drive motor 22 stops when the soil auger 21 reaches its upper and lower limits.

An anemometer 44 can be placed on the irrigation system 10 to determine when wind speeds exceed a predetermined threshold. A controller 45 can be connected to the anemometer 44 and to the anchoring device 20 to automatically activate the drive motor 22 to deploy the soil auger 21 into the ground whenever wind speeds exceed the threshold wind speed. For example, the threshold wind speed can be set at 60 mph by programming the controller 45, so that whenever the measured wind speed meets or exceeds 60 mph, the controller 45 causes the soil auger 21 of the anchoring device 20 to be automatically screwed into the ground. The controller 45 can also be used to energize the drive motor 22 remotely using a cell phone, or to allow a user to manually start and stop the drive motor 22.

The controller 45 can also be programmed to send a message to an operator when the threshold wind speed is exceeded. The operator can then determine whether to activate the anchoring device 20 based on current weather conditions, the position of the irrigation system in the field, the operating status of the irrigation system, and so forth. If the operator wants to activate the anchoring device 20, the operator can energize the drive motor 22 remotely by sending a command to the controller 45 using a cell phone or other electronic device capable of communicating with the controller 45. The controller 45 can be equipped with a cell phone module, RF radio, or other known communication system to provide a means for sending information to the operator and for receiving remote commands from the operator to cause the drive motor 22 to lower or raise the soil auger 21. For example, a known remote monitoring and command system for self-propelled irrigation systems, such as the Field Commander system marketed by AgSense of Huron, S. Dak., can be used to provide remote monitoring of wind speed conditions and to control the anchoring device 20 through the controller 45.

The drive motor 22 can be powered by a high voltage electricity source that is typically available on the self-propelled irrigation system 10. Alternatively, the drive motor 22 can be powered by low voltage electric systems, or by hydraulic or pneumatic systems. For example, a self-propelled irrigation system with hydraulically driven support towers can be equipped with an anchoring device with a hydraulic drive motor so that the existing hydraulic system can be used to power the anchoring device.

While the invention has been specifically described in connection with specific embodiments thereof, it is to be understood that this is by way of illustration and not of limitation, and the scope of the appended claims should be construed as broadly as the prior art will permit.

What is claimed is:

1. An anchoring device for a self-propelled irrigation system, comprising:
   a soil auger supported on the irrigation system and arranged to be raised and lowered relative to the irrigation system, said soil auger comprising a lower tip, a multi-sided head at an upper end, and a helical screw portion between said lower tip and said upper end;
   a drive motor mounted to said irrigation system;
   a drive mechanism arranged between said drive motor and said soil auger to transfer rotational force from said drive motor to said soil auger, said drive mechanism comprising a sleeve member having a generally vertical longitudinal axis and a multi-sided inner surface that mates with said multi-sided head of said soil auger and allows said soil auger to slide within said sleeve member while remaining fixed against rotation relative to said sleeve member; and
   at least one bit cleaner arranged to engage said helical screw portion of said soil auger to clean soil and debris from the auger and to cause the soil auger to move vertically relative to said sleeve member upon rotation of said sleeve member together with said soil auger, whereby said soil auger can be driven into the soil to anchor the irrigation system to prevent overturning during severe weather.

2. The anchoring device according to claim 1, wherein said drive motor is mounted stationary relative to said irrigation system, and said soil auger is raised and lowered relative to said drive motor.

3. The anchoring device according to claim 1, further comprising a remote control system that includes a wind speed measuring device, a means for sending a message to an operator when a predetermined wind speed threshold is exceeded, and a means for receiving a remote command from the operator to cause said drive motor to lower said soil auger into the ground to anchor the irrigation system during high wind conditions.

4. The anchoring device according to claim 1, further comprising a control system that allows the drive motor to be energized remotely using a cell phone or other electronic device.

5. The anchoring device according to claim 1, wherein said drive motor is operable to rotatably drive the soil auger in a first direction for winding the soil auger into the ground to an anchoring position, and in a second direction for unwinding the soil auger to retract the soil auger from the ground.

6. The anchoring device according to claim 1, wherein said multi-sided inner surface of said sleeve comprises a generally square chamber.

7. The anchoring device according to claim 1, wherein said at least one bit cleaner comprises at least two bit cleaners which run in valleys of the helical screw portion of said soil auger to clean the soil auger, to cause vertical movement of said soil auger when the soil auger rotates, and to prevent the soil auger from moving vertically relative to said irrigation system when the soil auger is stationary.

8. The anchoring device according to claim 7, wherein said at least two bit cleaners comprise four bit cleaners.

9. The anchoring device according to claim 1, wherein said lower tip is a carbide bit that allows the soil auger to penetrate hard soils and rocks.

10. The anchoring device according to claim 1, further comprising upper and lower sensors located adjacent to the soil auger to detect when the soil auger is in a fully raised position and a fully lowered position, respectively.

11. The anchoring device according to claim 1, wherein said sleeve member comprises an open upper end, and further comprising a removable top cap for covering said open upper end to provide a weather seal, and for allowing the soil auger to be inserted into and removed from said sleeve member.

12. A self-propelled irrigation system that resists overturning in high winds, comprising:
   an elongated pipeline supported above a field by at least one drive tower, said drive tower comprising a base beam assembly, a tower structure supported by and extending above said base beam assembly for supporting the elongated water pipeline above the base beam assembly, and a plurality of drive assemblies for supporting and propelling the base beam assembly over a field; and
   an anchoring device for anchoring the drive tower to the ground, said anchoring device comprising:
     a soil auger supported on the irrigation system and arranged to be raised and lowered relative to the irrigation system, said soil auger comprising a lower tip, a multi-sided head at an upper end, and a helical screw portion between said lower tip and said upper end;
     a drive motor mounted to said irrigation system;
     a drive mechanism arranged between said drive motor and said soil auger to transfer rotational force from said drive motor to said soil auger, said drive mechanism comprising a sleeve member having a generally vertical longitudinal axis and a multi-sided inner surface that mates with said multi-sided head of said soil auger and allows said soil auger to slide within said sleeve member while remaining fixed against rotation relative
     at least one bit cleaner arranged to engage said helical screw portion of said soil auger to clean soil and debris from the auger and to cause the soil auger to move vertically relative to said sleeve member upon rotation of said sleeve member together with said soil auger, whereby said soil auger can be driven into the soil to anchor the irrigation system to prevent overturning in high winds.

13. The irrigation system according to claim 12, wherein said drive motor is mounted stationary relative to said irrigation system, and said soil auger is raised and lowered relative to said drive motor.

14. The irrigation system according to claim 12, further comprising a remote control system that includes a wind speed measuring device, a means for sending a message to an operator when a predetermined wind speed threshold is exceeded, and a means for receiving a remote command from the operator to cause said drive motor to lower said soil auger into the ground to anchor the irrigation system during high wind conditions.

15. The irrigation system according to claim 12, further comprising a control system that allows the drive motor to be energized remotely using a cell phone or other electronic device.

16. The irrigation system according to claim 12, wherein said drive motor is operable to rotatably drive the soil auger in a first direction for winding the soil auger into the ground to an anchoring position, and in a second direction for unwinding the soil auger to retract the soil auger from the ground.

17. The irrigation system according to claim 12, wherein said multi-sided inner surface of said sleeve comprises a generally square chamber.

18. The irrigation system according to claim 12, wherein said at least one bit cleaner comprises at least two bit cleaners which run in valleys of the helical screw portion of said soil auger to clean the soil auger, to cause vertical movement of said soil auger when the soil auger rotates, and to prevent the soil auger from moving vertically relative to said irrigation system when the soil auger is stationary.

19. The irrigation system according to claim 18, wherein said at least two bit cleaners comprise four bit cleaners.

20. The irrigation system according to claim 12, wherein said lower tip is a carbide bit that allows the soil auger to penetrate hard soils and rocks.

21. The irrigation system according to claim 12, further comprising upper and lower sensors located adjacent to the soil auger to detect when the soil auger is in a fully raised position and a fully lowered position, respectively.

22. The irrigation system according to claim 12, wherein said sleeve member comprises an open upper end, and further comprising a removable top cap for covering said open upper end to provide a weather seal, and for allowing the soil auger to be inserted into and removed from said sleeve member.

* * * * *